United States Patent
Dabrowa et al.

(10) Patent No.: US 8,928,805 B2
(45) Date of Patent: Jan. 6, 2015

(54) METHOD FOR IMPROVING CHANNEL CHANGE IN A TELEVISION APPLIANCE

(75) Inventors: Andrzej Dabrowa, Zielona Gora (PL); Roman Lysak, Kharkov (UA)

(73) Assignee: Advanced Digital Broadcast S.A., Chambesy (CH)

( * ) Notice: Subject to any disclaimer, the term of this patent is extended or adjusted under 35 U.S.C. 154(b) by 0 days.

(21) Appl. No.: 14/237,355

(22) PCT Filed: Aug. 6, 2012

(86) PCT No.: PCT/EP2012/065352
§ 371 (c)(1),
(2), (4) Date: May 11, 2014

(87) PCT Pub. No.: WO2013/020949
PCT Pub. Date: Feb. 14, 2013

(65) Prior Publication Data
US 2014/0300815 A1 Oct. 9, 2014

(30) Foreign Application Priority Data

Aug. 8, 2011 (EP) .................................... 11006490
Mar. 16, 2012 (EP) .................................... 12160000

(51) Int. Cl.
*H04N 7/01* (2006.01)
*H04N 5/04* (2006.01)
*H04N 21/438* (2011.01)
*H04N 21/439* (2011.01)
*H04N 21/44* (2011.01)
*H04N 21/4402* (2011.01)
*H04N 5/50* (2006.01)

(52) U.S. Cl.
CPC ............. *H04N 5/04* (2013.01); *H04N 21/4383* (2013.01); *H04N 21/4392* (2013.01); *H04N 21/44004* (2013.01); *H04N 21/440281* (2013.01); *H04N 5/50* (2013.01)
USPC ........................................................ 348/441

(58) Field of Classification Search
USPC ......... 348/515, 516, 500, 517, 521, 441, 448, 348/556–558, 445, 449
See application file for complete search history.

(56) References Cited

U.S. PATENT DOCUMENTS

| | | | | |
|---|---|---|---|---|
| 5,642,171 A | * | 6/1997 | Baumgartner et al. | 348/515 |
| 6,975,363 B1 | * | 12/2005 | Baldwin et al. | 348/512 |
| 7,012,650 B2 | * | 3/2006 | Hu et al. | 348/515 |
| 7,495,705 B2 | * | 2/2009 | Baldwin et al. | 348/512 |
| 7,843,818 B2 | * | 11/2010 | Chu et al. | 370/230 |
| 8,111,282 B2 | * | 2/2012 | Cutler et al. | 348/14.01 |
| 8,583,268 B2 | * | 11/2013 | Thapa | 700/94 |
| 2004/0252756 A1 | * | 12/2004 | Smith et al. | 375/240.01 |
| 2009/0276813 A1 | * | 11/2009 | Bleiweiss et al. | 725/82 |
| 2010/0043038 A1 | * | 2/2010 | Li | 725/103 |

* cited by examiner

Primary Examiner — Paulos M Natnael
(74) Attorney, Agent, or Firm — Mark M. Friedman

(57) ABSTRACT

It is disclosed a method for changing channel in a television appliance. Upon reception of a user command to tune on a desired channel (301), the television appliance is tuned on the desired channel (302) and audio and video packets are received. Video and audio packets are buffered in relative buffers, so that audio and video output can be generated by processing the buffered packets. Video output frame rate is increased from a first, slower, frame rate to a predetermined final frame rate. Independently from the frame rate increasing law, video output frame rate is raised to the final frame rate as soon as an audio output can be generated from the buffered video packets which is synchronized to the video output. A television appliance implementing the method is also disclosed.

12 Claims, 5 Drawing Sheets

METHOD FOR IMPROVING CHANNEL CHANGE IN A TELEVISION APPLIANCE

TECHNICAL FIELD

The present invention relates to the field of television appliances, like set-top-boxes or TV sets, which are adapted to receive broadcasted digital television signals. In particular, the invention relates to methods for controlling channel change in a television appliance.

BACKGROUND ART

As it is known, a television signal comprises both audio and video that shall be synchronized when played.

DVB (Digital Video Broadcasting) standards provides for broadcasting transport streams each comprising a plurality of channels (services). Each transport stream comprises a plurality of elementary packets transporting audio, video and data.

Each frame of the television signal can require a different bandwidth for its transmission, e.g. I-frames are less compressed then P and B-frames. Each frame can therefore be divided in a different number of elementary packets and transmitted in one or more transport streams.

As a result, audio and video are not always transmitted in the same transport stream; actually audio can arrive up to 3 s later then the respective video.

When a user changes TV channel, audio and video are displayed only when the television appliance has been able to receive both of them. The result is that when a user changes channel, a black screen is displayed for few seconds or milliseconds depending on the transmission delay between audio and video.

If time delay is long, often user can change channel thinking that no signal is available; this often happens during zapping, wherein the user changes channel very rapidly to have an overview of what's on TV.

WO2009/047273 faces the problem of channel zapping time and discloses a method for an early start of audio-video rendering.

WO2009/047273 discloses several methods wherein after video stream reception, video rendering is started with a speed which is slower than the normal rendering speed. Rendering speed is then accelerated until a video buffer is filled and video is rendered at normal speed.

According to the different embodiments disclosed by WO2009/047273, audio can be rendered synchronized or desynchronized to the video during video speed acceleration. In case audio is rendered desynchronized to video, this can be annoying for the user. In case audio is rendered synchronized to video, an audio pitch algorithm is necessary in order to compensate for audio distortion introduced by the reduced video speed; such an algorithm can be expensive and not that efficient in case of audio rendering at very slow speed. If audio pitch algorithm is not available, according to WO2009/047273 audio is not rendered until video can be rendered at normal speed; this solution has the drawback that audio that could be rendered, is not rendered and the user therefore loses information carried by the audio.

OBJECTS AND SUMMERY OF INVENTION

It is therefore an object of the present invention to present a method for solving the drawback of channel change in prior art television appliances.

In particular it is an object of the present invention to present a method for channel change that reduces probability that a user changes channel thinking that no signal is available.

It is also an object of the present invention to present a television appliance, and in particular a set-top-box, implementing the method for channel change.

These and further objects of the present invention are achieved by means of a method and a television appliance comprising the features of the annexed claims, which are integral part of the present description.

Inventors have thought of a method for changing channel in a television appliance wherein, upon reception of a command to tune on a desired channel, the television appliance is tuned on the desired channel and audio and video packets are received. Video and audio packets are buffered in relative buffers, so that audio and video output can be generated by processing the buffered packets.

Video output frame rate (i.e. frequency at which consecutives frames are produced) is increased from a first, slower, frame rate to a predetermined final frame rate. Independently from the frame rate increasing law, video output frame rate is raised to the final frame rate as soon as an audio output can be generated from the buffered video packets which is synchronized to the video output.

This solution has the advantage that in case of channel change, video is rendered in short times, before audio is received. At the same time, video and audio are rendered synchronized as soon as this is possible, without waiting for a video buffer to be filled in.

In one preferred embodiment, video output frame rate is increased according to a monotone law, preferably an exponential one, before said synchronized audio and video output is generated. In this way user does not feel that the television appliance is not working, but has the impression that it is actually starting to present the TV program.

Preferably video output frame rate is increased up to a second predetermined value, preferably lower than the final frame rate, and then video output frame rate is kept constant at said second predetermined value until audio packets are received and synchronized audio and video is output. This solution allows synchronization of audio and video also when audio arrives with a huge delay.

In another embodiment, video output is generated after a predetermined time interval from reception of the first video packets.

In one aspect, the invention is directed to a computer program comprising program code means for performing all the steps of the method according to the teachings of the following description and claims, when said program is run on a computer.

In another aspect, the invention is directed to a computer readable medium storing computer-executable instructions performing all the steps of the computer-implemented method according to the teachings of the following description and claims, when executed on a computer.

In another aspect, the invention is directed to a television appliance comprising an input block for receiving a transport stream comprising audio and video packets of a TV channel. A memory block allows buffering audio and video packets, and a video output block and an audio output block allowing output of audio and video. The television appliance further comprises a user interface block for receiving a user command to change TV channel. A control unit is operatively connected to the input block, to the user interface block, to the memory block, to the audio output block and to the video output block. The control unit is suitable for tuning input block on a TV channel selected by a user and for generating synchronized audio and video outputs respectively on the audio block and on the video block. The control unit is further adapted to generate a video output (307) with a first frame rate and to increase video output frame rate from said first frame rate to a predetermined final frame rate; frame rate is raised to the final frame rate as soon as said memory block contains audio and video packets which can be processed by the control unit to generate synchronized audio and video output.

BRIEF DESCRIPTION OF THE DRAWINGS

Further features and advantages of the present invention will become apparent in the detailed description of preferred non-exclusive embodiments of a coding method and of a decoding method, and of relative systems according to the invention, which are described as non-limiting examples with the help of the annexed drawings, wherein.

These drawings illustrate different aspects and embodiments of the present invention and, where appropriate, like structures, components, materials and/or elements in different figures are indicated by the same reference numbers.

DETAILED DESCRIPTION OF THE INVENTION

Figure 1:
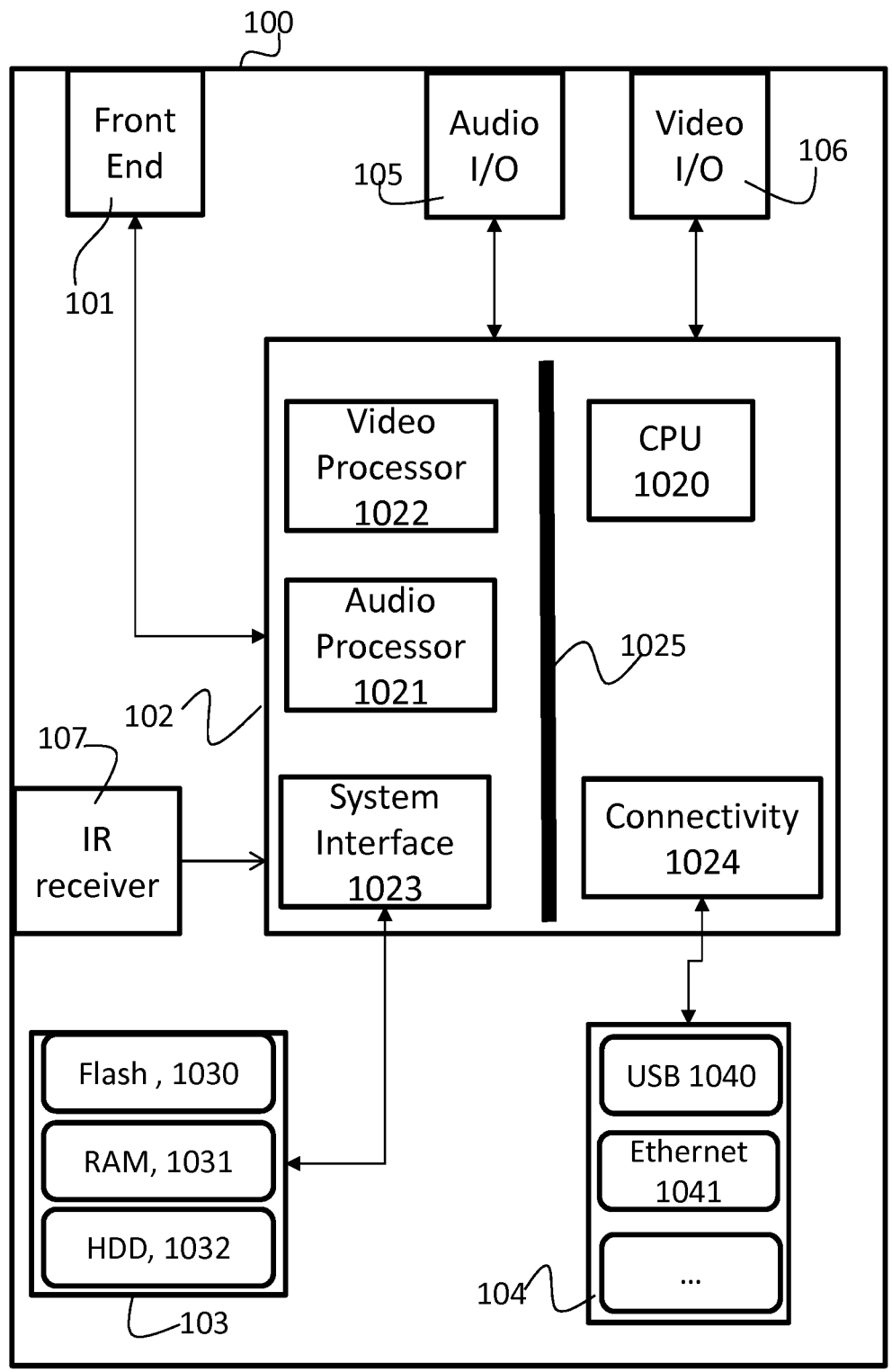
FIG. 1, schematically represents a television appliance according to the present invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

In the following description and in the figures, like elements are identified with like reference numerals. The use of "e.g.," "etc.," and "or" indicates non-exclusive alternatives without limitation unless otherwise noted. The use of "including" means "including, but not limited to," unless otherwise noted.

FIG. 1 schematically illustrates a television appliance 100. For sake of clarity only most important functional blocks of the television appliance 100 are represented in FIG. 1, while it is intended that further features can be provided on television appliance 100. In the following examples, television appliance 100 is a set top box, nevertheless, in other embodiments television appliance 100 can be any device suitable to output a video signal or to directly display a video signal on a screen; as an example, the television appliance can be a TV set, a DVR (Digital Video Recorder), a mobile phone or a palm computer.

Television appliance 100 comprises a front end 101 for receiving a digital television signal, in particular a transport stream comprising MPEG compressed video packets. Front end 101 comprises a tuner for tuning on a user selected video channel and for providing an IF (intermediate frequency) signal to a processor 102.

Processor 102 comprises a CPU (central processing unit, 1020), an audio processor 1021, a video processors 1022, a system interface block 1023, a connectivity block 1024. Communication between these blocks is achieved by means of a bus 1025, e.g. an IC2 bus.

An user interface block, in particular an infra-red (IR) receiver, 107 is used for receiving user commands from a remote control (not shown in FIG. 1).

When a user selects a TV channel, processor controls front end 101 (in particular a tuner) to tune on the requested TV channel. Television signals from front end 101 are then received by processor 102, wherein they are demodulated before a parser, executed by CPU 1020, separate video and audio packets of the received transport stream. While video packets are processed by video processor 1022, audio packets are processed by audio processor 1021.

System interface block 1023 allows communication with a memory block 103 comprising different type of memories: non-volatile memories 1030 (e.g. FLASH, NAND, NOR), volatile memories 1031 (RAM, DRAM) and storage devices 1032 (e.g. Hard Disk drivers HDD or solid state driver SDD).

Non-volatile memories stores drivers and applications necessary for the correct boot up and operation of the television appliance 100, while storage device are preferably used for storing recorded video streams.

Connectivity block 1024 is used managing connection with external components 104, like USB ports 1040, Network Interface Cards 1041 communicating via Ethernet protocol, and so on.

Processor 102 is therefore adapted to process MPEG A/V signals stored in storage device 1032 or received via connectivity block 1024, e.g. IPTV (Internet Protocol Television) signal.

Television appliance 100 further comprises audio I/O block 105 and video I/O block 106. Blocks 105 and 106 are used to receive audio and video from different sources, like a DVD reader, a Blu-Ray disk reader, an analog amplifier, a Video Cassette Recorder and so on. Blocks 105 and 106 further represent audio and video outputs, e.g. HDMI output to be provided to a TV set.

When processor 102 receives a command to change TV channel, it starts the method hereby described with reference to FIGS. 2 and 3. The command to change channel can be issued by a user and received via a user interface (107) or can be issued by a processor, e.g. in case a timer is set for recording and/or displaying a video.

At time t0 processor 102 receives a channel change command (step 301) via the IR receiver 107. In response to the user command, processor 102 controls (step 302) tuner of the front end 101 and therefore it starts receiving video packets relative to a TV program broadcasted on the requested TV channel.

Elementary video packets are buffered in volatile memory 1031 (steps 303).

As video packets are received, the method therefore provides for starting a timer to check if audio packets are received before a predetermined time (t1). This timer is represented in FIG. 3 by blocks 304 and 305.

During time interval t0 to t1, therefore, processor 102 checks if audio packets are received (step 304). If yes, synchronized audio and video is output (step 306).

If audio and video is not received before t1, then the method continues with step 305 to check if time interval t1 has not elapsed. If t1 is passed since first video packets were received, then at time t1 processor starts outputting (step 307) the first video frames, herein after also called intermediate video frames. Intermediate video frames are generated from the received video packets and are therefore output for displaying before audio packets are received. In the preferred embodiment, start time t1 for intermediate video output is preferably selected as the minimum time between 500 ms and time difference between PTS and PCR: t1=min(500 ms, PTS-PCR), wherein PTS ("presentation time-stamp") and PCR ("Program Clock Reference") are values of MPEG coding defined by ISO/IEC 13818-1: 1994(E).

Figure 2:
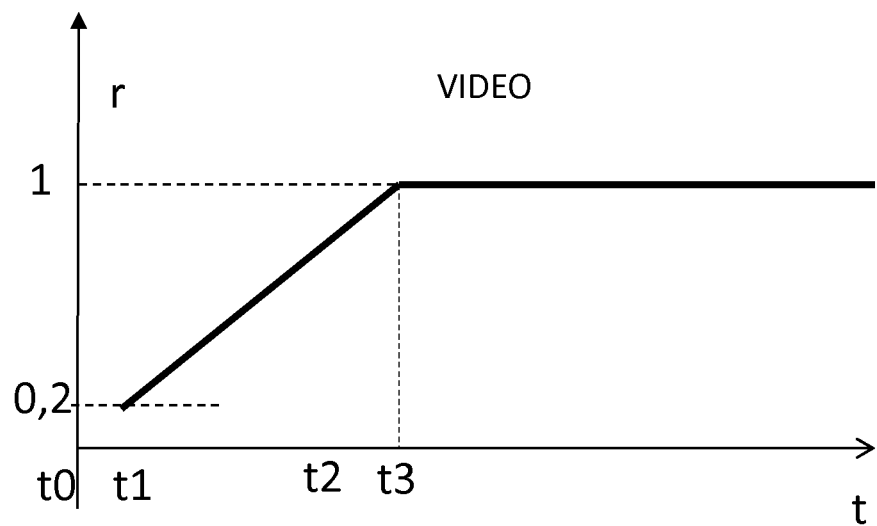
FIG. 2 shows audio and video output according to an embodiment of the present invention.
Figure 2:
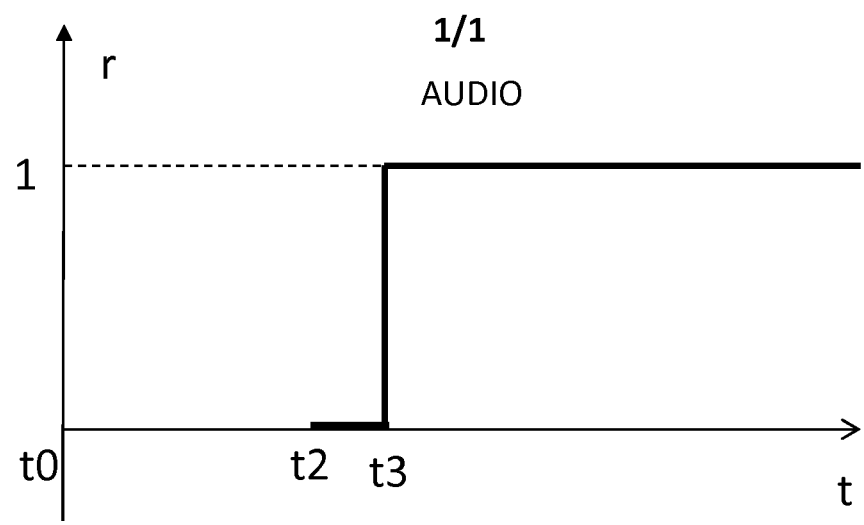
Figure 3:
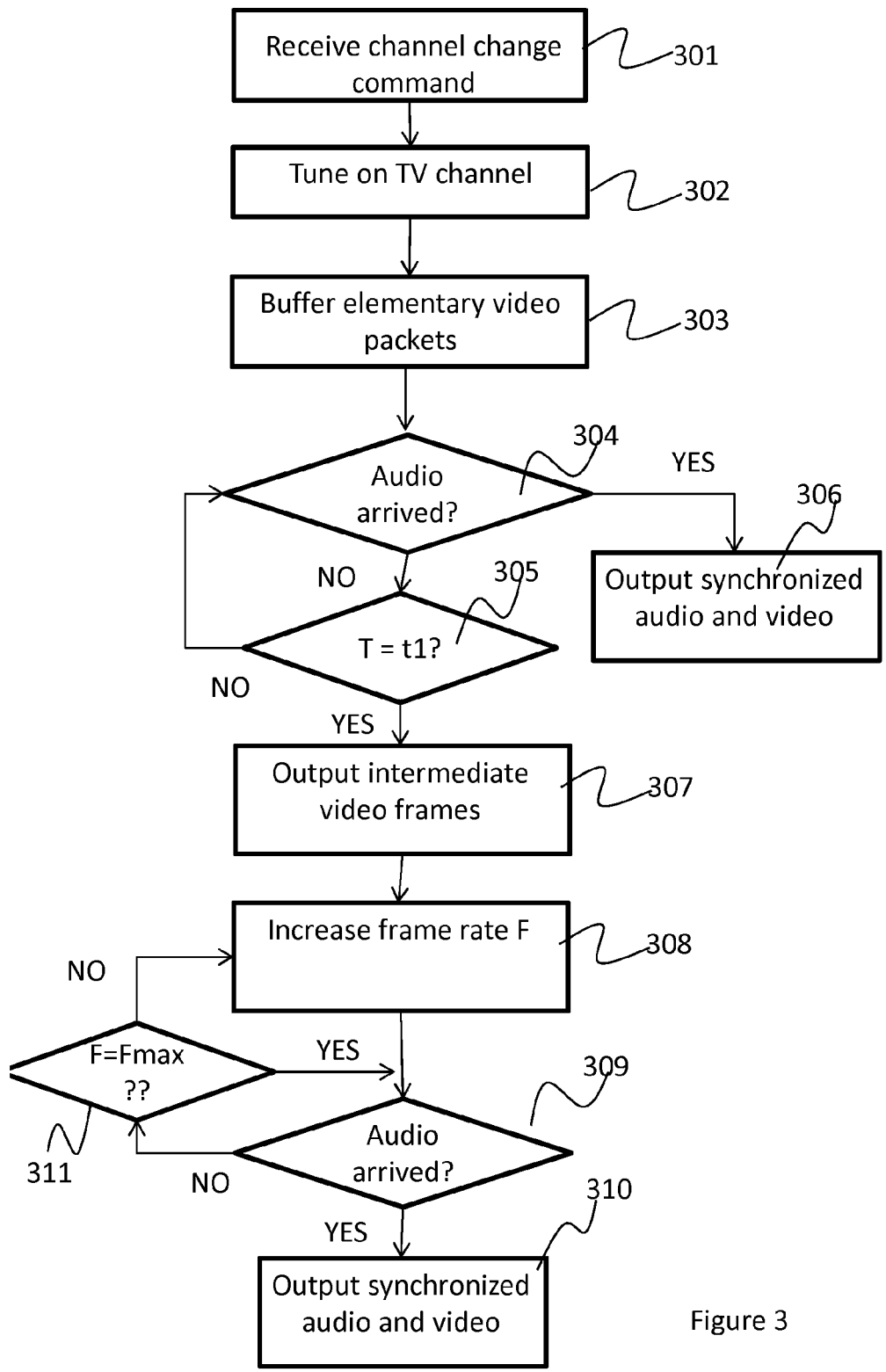
FIG. 3 is a flow chart of a method according to an embodiment of the invention.

As it can be seen from FIG. 2, video frames are output at a reduced frame rate. Most common frame rate in television field is usually 24 FPS (frames per seconds) or 25 FPS or 30 FPS, nevertheless the present invention applies to any frame rate, therefore in the following example the normal frame rate of the video signal is normalized to 1. Considering to be 1 the normal frame rate, in the embodiment of FIG. 2 video frames are initially output at frame rate equal to 0.2, i.e. one fifth of the final frame rate.

Frame rate is then increased up (step 308) to reach a frame rate of 1 at time t3, once audio data synchronized with the currently displayed video are output. In other words, frame rate in increased up to reach the final frame rate. From a logical point of view, a loop is created wherein after increasing of the frame rate, a check is made (step 309) to verify if audio packets have been received which are ready to be synchronized with video frames. If they are, then synchronized audio and video is output (step 310), if not the loop is repeated and frame rate increased.

Preferably frame rate is increased according to a monotone law.

Preferably increasing of frame rate is exponential.

In the embodiment of FIG. 2 first audio packets are received at time t2, nevertheless, they will be related to frames already displayed and therefore they are not output. Since at time t2 video frame is still displayed at a reduced frame rate, at time t3 audio packets are synchronized with video frames and are ready to be output.

Since delay between audio and video (t0−t2) is not known, increasing in frame rate follows a predetermined law which is based on experimental analysis and which is based on expectation that audio will arrive after 2 s after video, in other words t2=2 s.

In one preferred embodiment, video frames are output after a delay (t1) of 0.5 s, while frame rate is increased from 50% to 75% from a to t1+0.5 s, and from 75% to 90% from t1+0.5 s to t1+1 s and from 90% to 95% from t1+1 s to t1+1.5 s.

Figure 4:
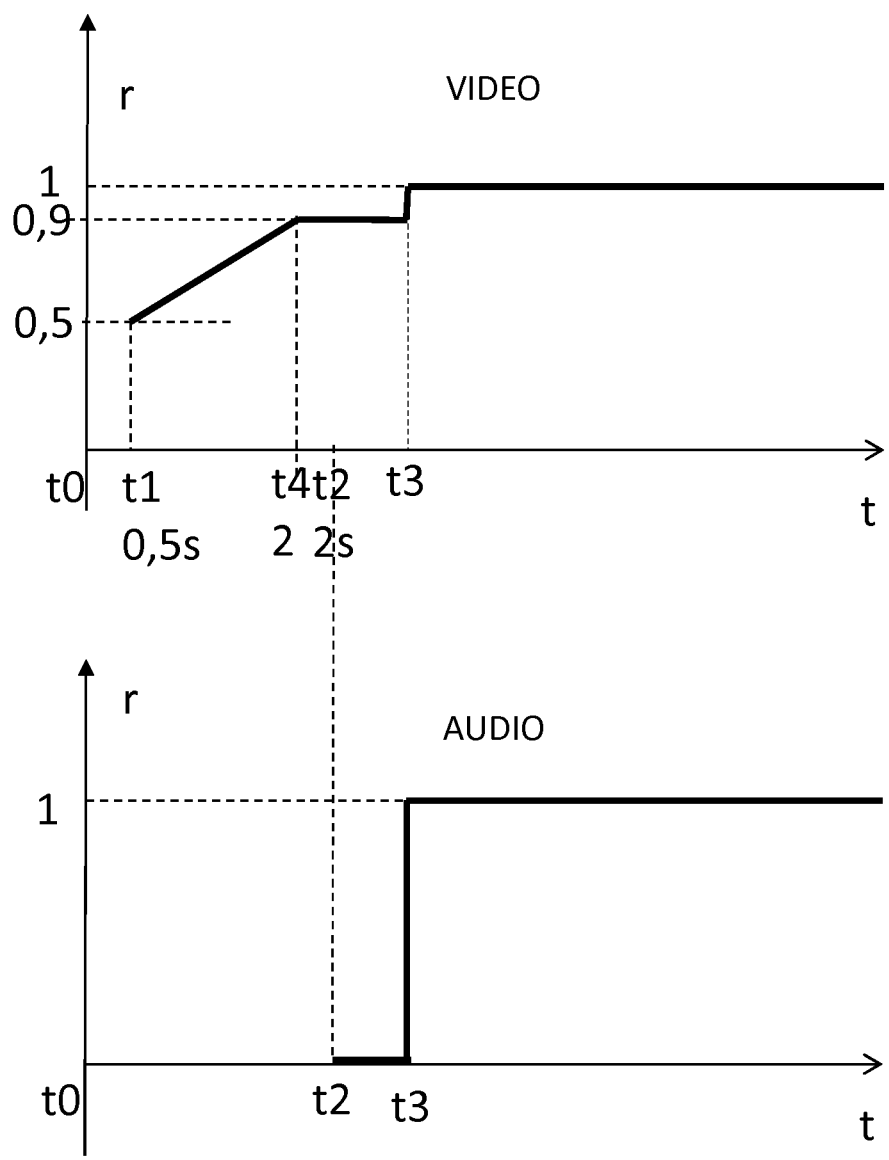
FIGS. 4 and 5 shows audio and video output in different cases based on time delay between audio and video.

In one preferred embodiment, frame rate increment follows a law according to which it is increased from a first predetermined value (preferably comprised between 20% and 50%) to a second predetermined value which is less than 100%, in a predetermined time interval (e.g. 1.5 s). After this predetermined time interval, frame rate is kept at the second predetermined value, so as to allow easier synchronization with audio as shown in FIG. 4, wherein audio is shown arriving at a time t2 equal to 2.2 s. This is represented in FIG. 3 by a verification step 311, wherein after step 310 a check is made on whether frequency rate (F) has reached this second predetermined value, i.e. its maximum value before synchronized audio and video is output.

In the embodiment of FIG. 4, video is output at time t1 after 0.5 s with a frame rate equal to 50% of the final frame rate. Frame rate is then increased up to 90% which value is reached at time t4=2 s. Frame rate is then kept at 90% until processor 102 is able to output synchronized audio and video (time t3). As it can be seen from FIG. 5, once audio and video can be output synchronized, video output frame rate is immediately raised to the final frame rate; increasing of frame rate to the final value therefore depends only on availability of audio that can be synchronized with video, it is therefore independent of the frame rate increasing law between t0 and t3.

Figure 5:
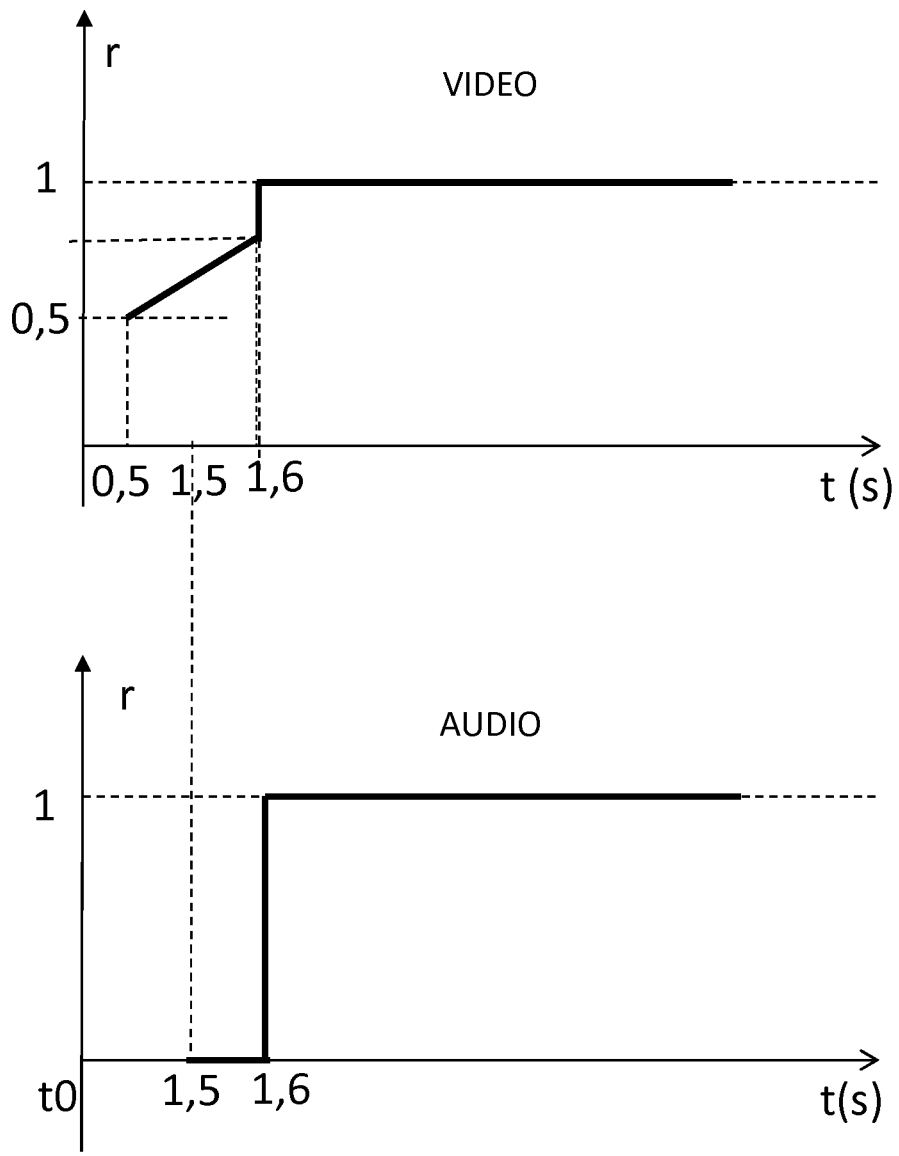

FIG. 5 shows the case wherein audio arrives before expected and therefore frame rate has completed its incremental law. In this example, frame rate is increased according to the same law of FIG. 4, yet audio arrives at a time t2 equal to 1.5 s and therefore processor 102 is ready to output synchronized audio and video after 1.6 s.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept.

The presented preferred embodiments are exemplary only, and are not exhaustive of the scope of the technical concept presented herein. Accordingly, the scope of protection is not limited to the preferred embodiments described in the specification, but is only limited by the claims that follow.

It can be easily recognized, by one skilled in the art, that the aforementioned appliance and method for channel change may be performed and/or controlled by one or more computer programs. Such computer programs are typically executed by utilizing the computing resources in a computing device such as personal computers, personal digital assistants, cellular telephones, receivers and decoders of digital television or the like. Applications are stored in non-volatile memory, for example a flash memory or volatile memory, for example RAM and are executed by a processor. These memories are exemplary recording media for storing computer programs comprising computer-executable instructions performing all the steps of the computer-implemented method according the technical concept presented herein.

The invention claimed is:

1. A method for changing channel in a television appliance, comprising the steps of:
   a) turning on a desired channel (302),
   b) receiving audio and video packets of a television stream transmitted in the desired channel,
   c) buffering the video packets (303) and the audio packets respectively in a video buffer and in an audio buffer,
   d) generating a video output (307) from the buffered video packets,
   e) increasing the video output frame rate (308) from a first frame rate to a predetermined final frame rate;
   f) generating an audio output from the buffered audio packets, the audio output being synchronized to the video output (310), and,
   g) increasing the video output frame rate according to a monotone law until the audio output and the video output are synchronized,
   wherein the video output frame rate is raised to the final frame rate as soon as an audio output is generated and synchronized to the video output (309, 310).

2. The method of claim 1, wherein the video output frame rate is raised to the final frame rate independently from the video output frame rate at which video is currently output when audio can be output synchronized to video output frame rate.

3. The method of claim 2, wherein said video output frame rate is increased up to a second predetermined value (308) and wherein said frame rate is kept constant at said second predetermined value until audio packets are received and synchronized audio and video is output.

4. The method of claim 3, wherein said second predetermined value is lower than said final frame rate.

5. The method of claim 1, wherein said monotone law is exponential.

6. The method according to claim 1 wherein said video output frame rate is generated after a predetermined time interval (t1) from reception of the first video packet.

7. A non-transitory computer readable medium storing computer-executable instructions performing all the steps of the computer-implemented method according to claim 1 when executed on a computer.

8. A television appliance comprising,
- an input block (101, 106, 104) for receiving a transport stream comprising audio and video packets of a TV channel,
- a memory block (103) for buffering received audio and video packets,
- a video output block (106),
- an audio output block (105)
- a user interface block (107) for receiving a user command to change TV channel,
- a control unit (102) operatively connected to the input block (101), to the user interface block (107), to the memory block (103), to the audio output block and to the video output block (106),
- said control unit (102) configured for: (i) tuning an input block (101) on a TV channel selected by a user and for generating synchronized audio and video outputs respectively on said audio block (105) and on said video block (106), (ii) generating a video output (307) with a first frame rate and to increase (308) video output frame rate from said first frame rate to a predetermined final frame rate, (iii) increasing said video output frame rate according to a monotone law before generating said synchronized audio and video outputs, and, (iv) taking the video output frame rate to the final frame rate as soon as said memory block contains audio and video packets which can be processed by the control unit to generate synchronized audio and video output.

9. The method of claim 8, wherein the video output frame rate is immediately raised to the final frame rate independently from the video output frame rate at which video is output when audio can be output synchronized to video output frame rate.

10. The television appliance of claim 8, wherein said control unit (102) is adapted to increase said video output frame rate up to a second predetermined value and is further adapted to keep constant said frame rate at said second predetermined value until said control unit is ready to generate said synchronized audio and video output.

11. The television appliance of claim 10, wherein said second predetermined value is lower than said final frame rate.

12. The television appliance claim 8, wherein said control unit (102) is adapted to generate said video output frame rate after a predetermined time interval (t1) from reception of the first video packet.

* * * * *